May 24, 1927. 1,630,022
F. A. LUNDQUIST
AUTOMATIC CONTROL FOR OIL BURNERS
Filed Feb. 28, 1924   10 Sheets-Sheet 4
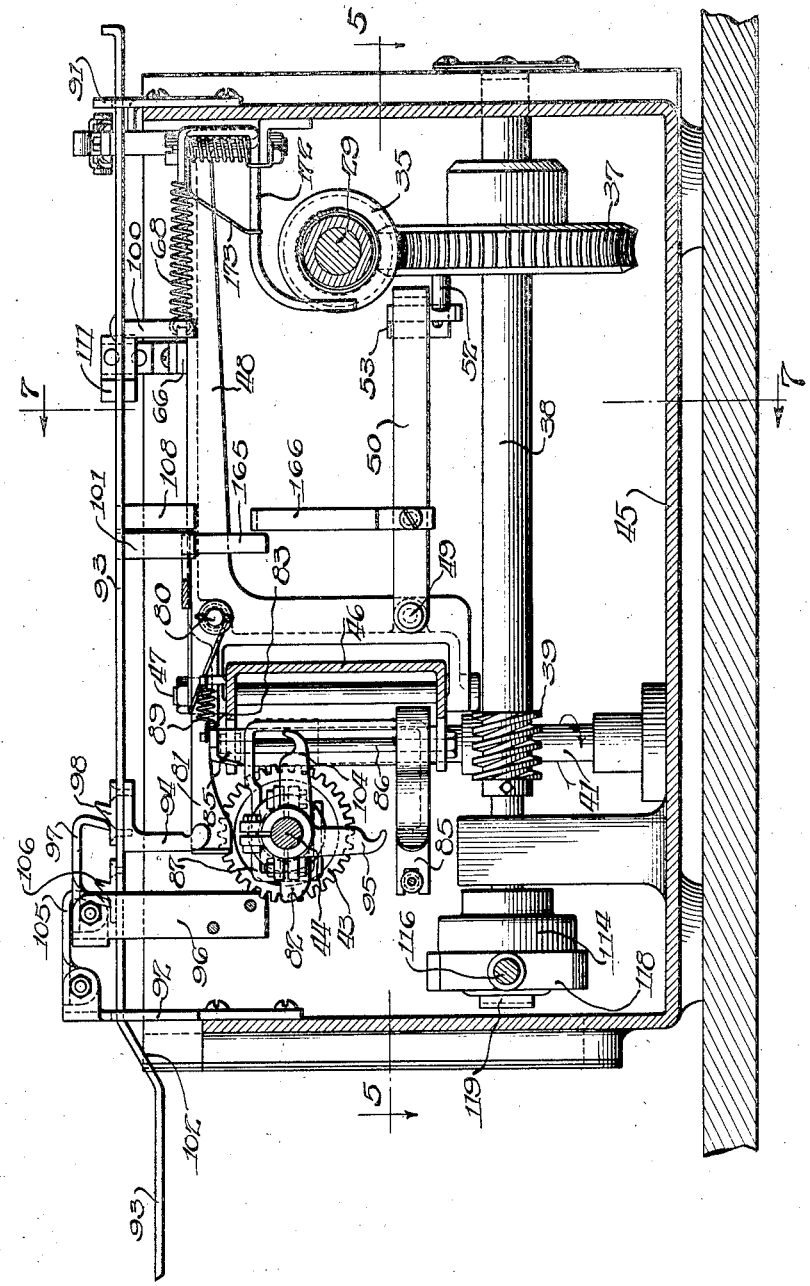
Witness:
E. L. Niederhofer
Inventor.
Frank A. Lundquist
By Casper L. Redfield
Atty.

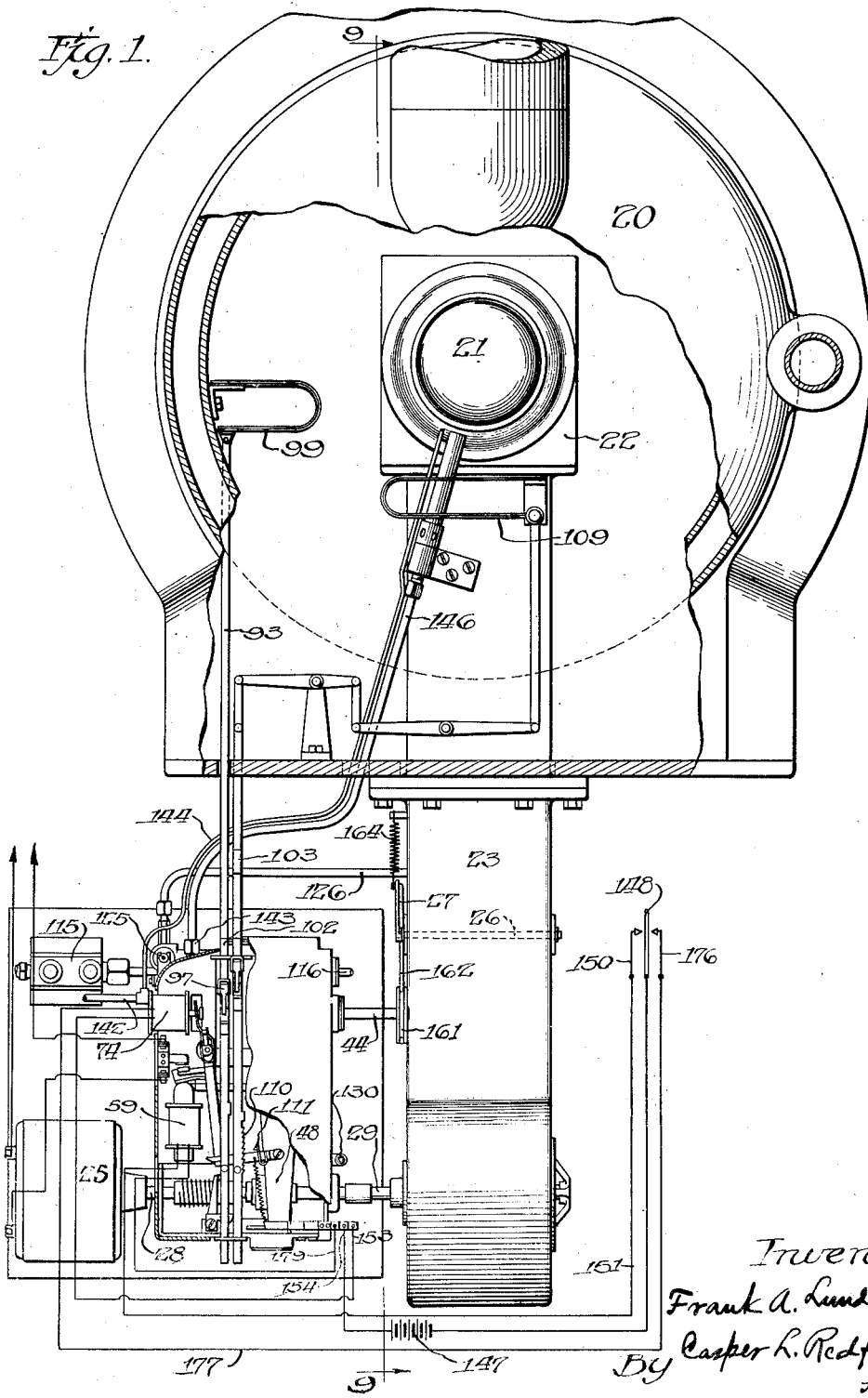

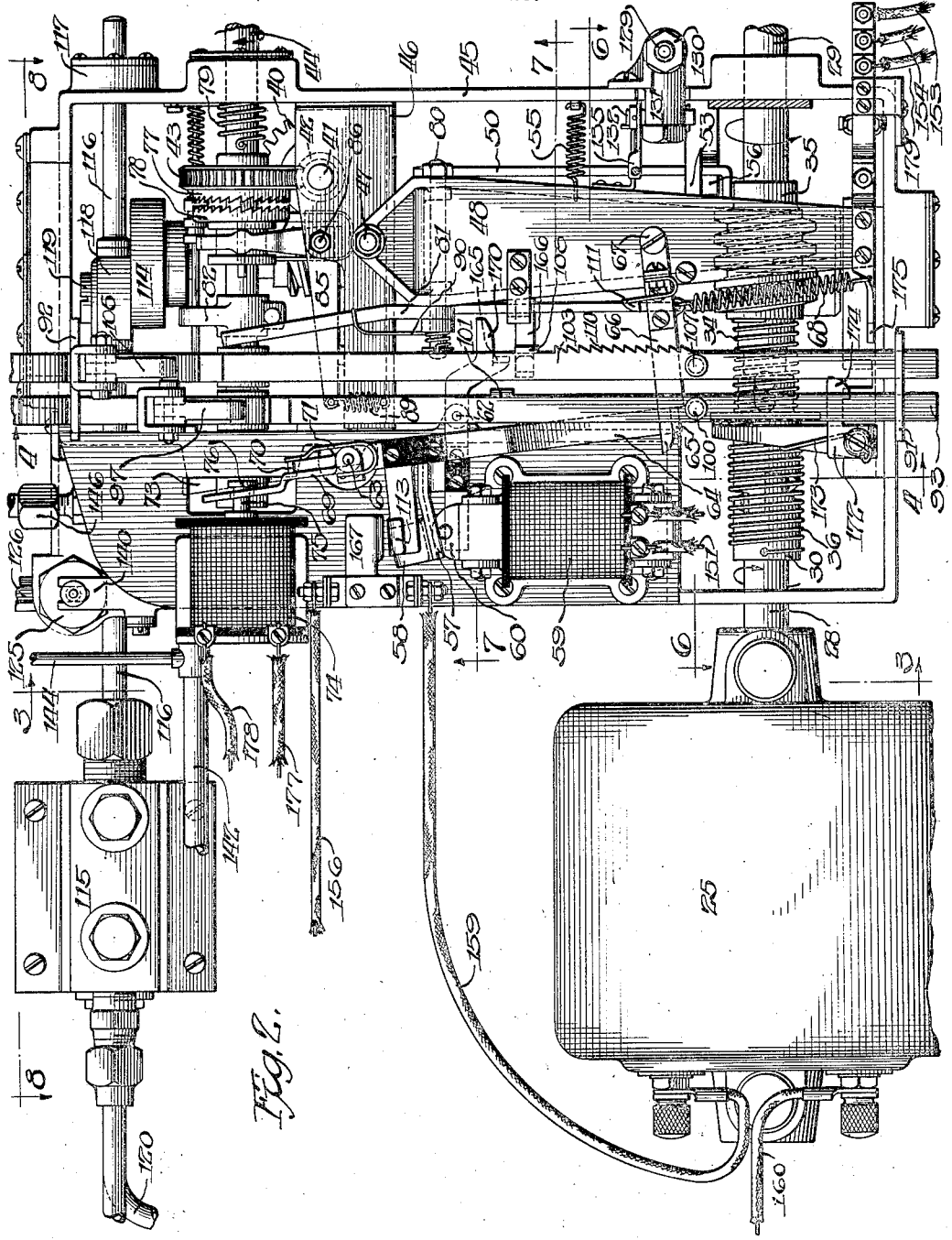

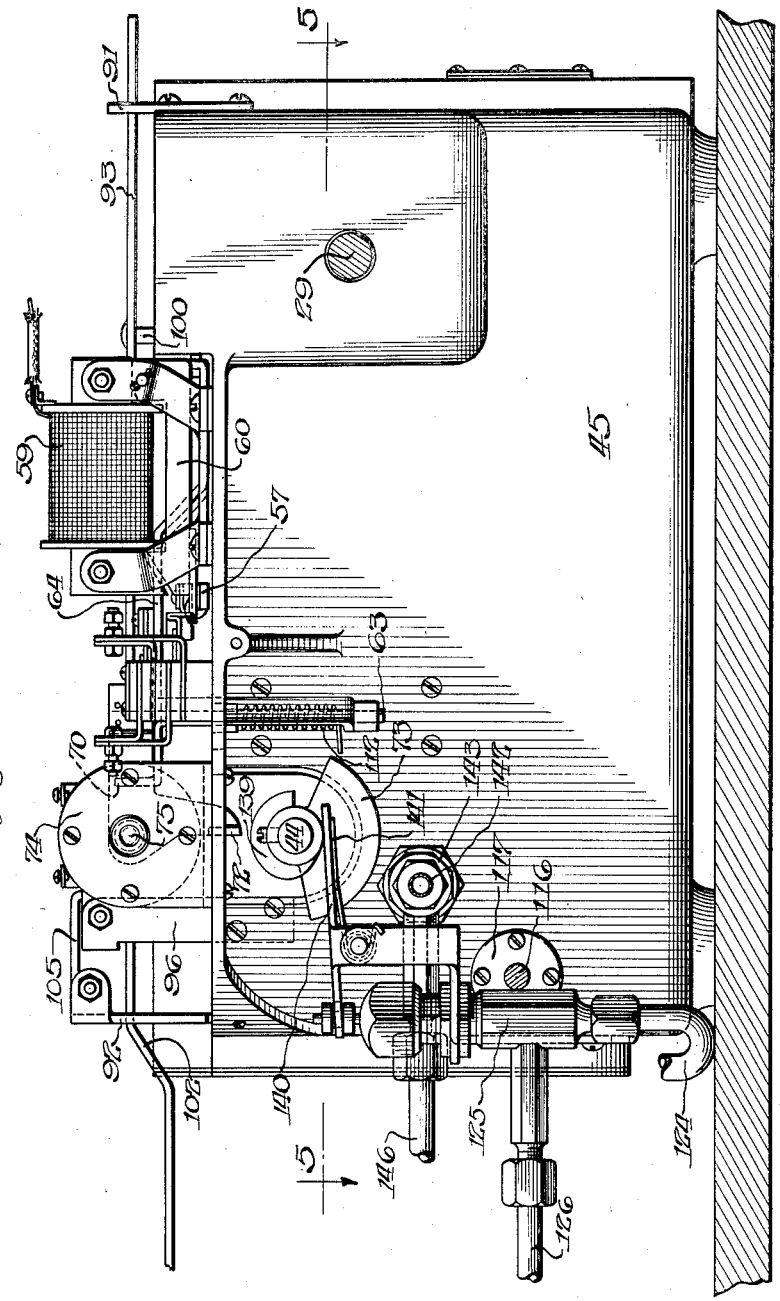

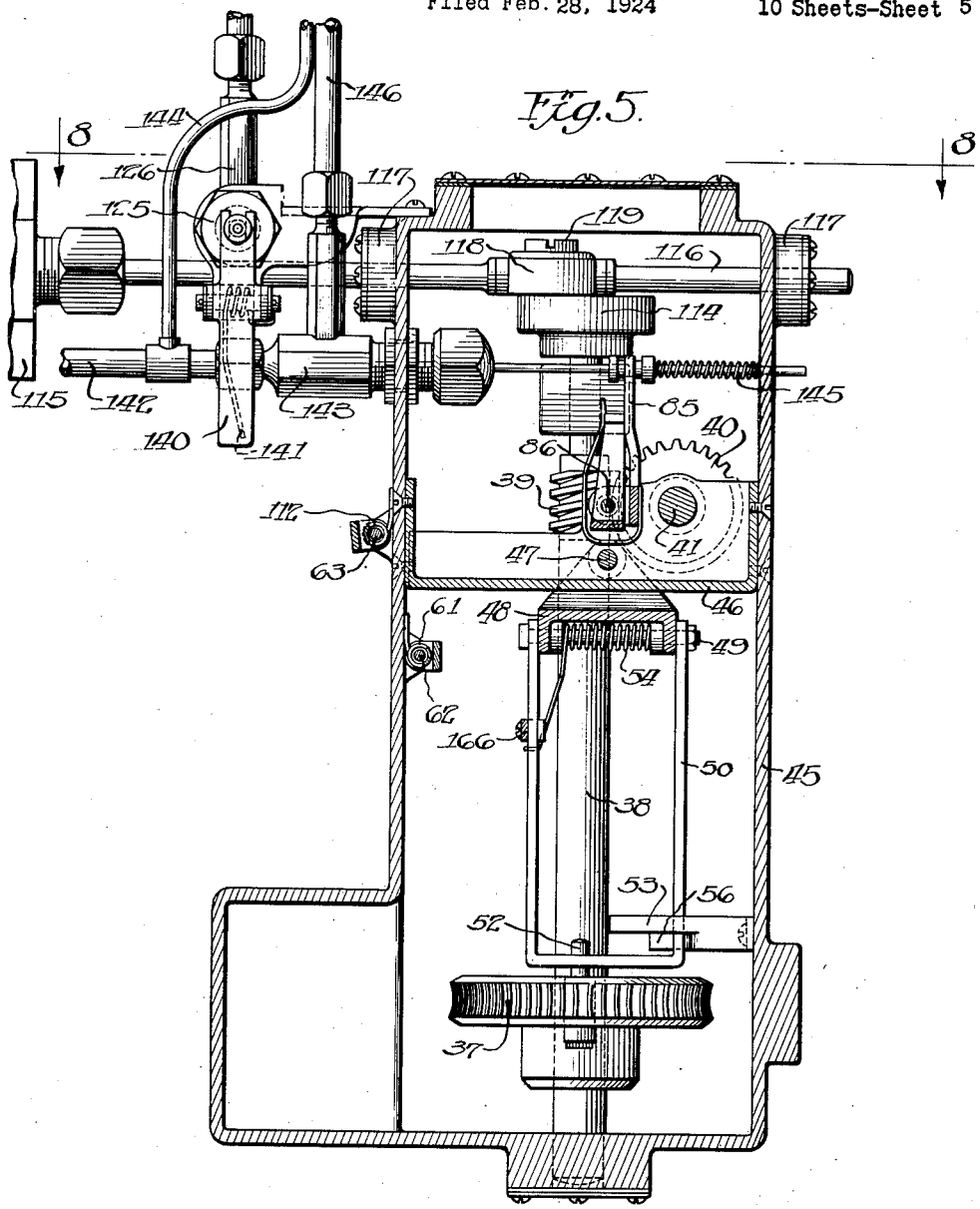

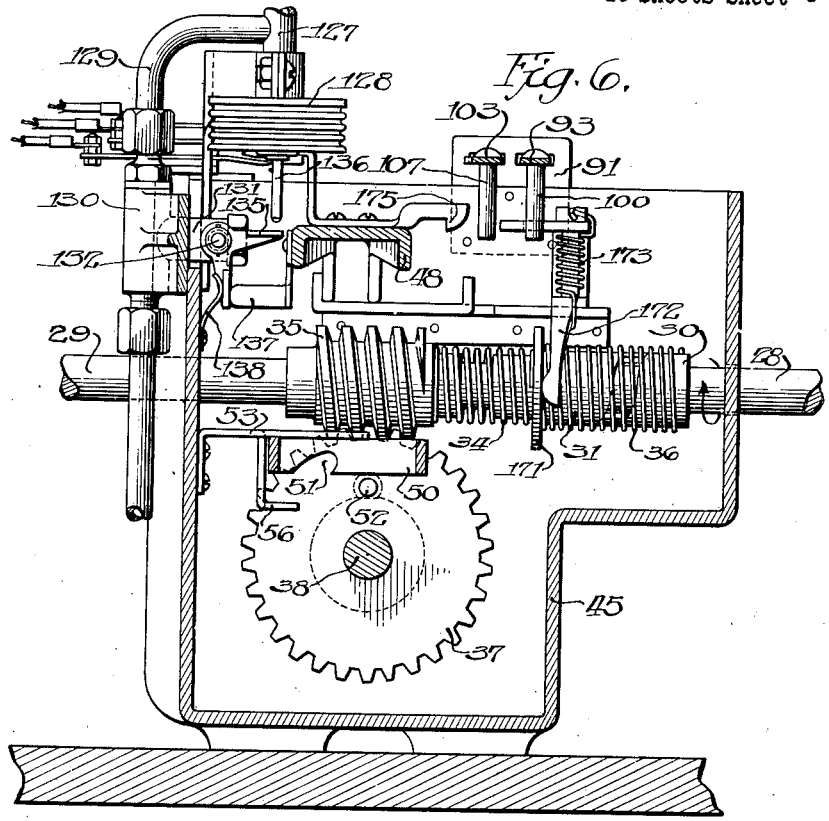
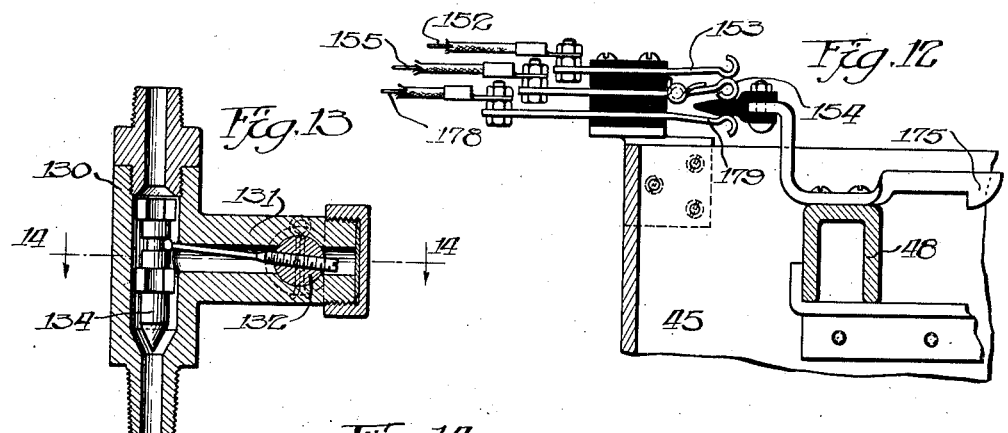
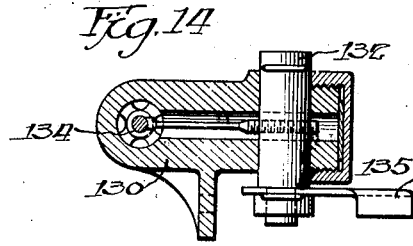

May 24, 1927.
F. A. LUNDQUIST
1,630,022
AUTOMATIC CONTROL FOR OIL BURNERS
Filed Feb. 28, 1924
10 Sheets-Sheet 7
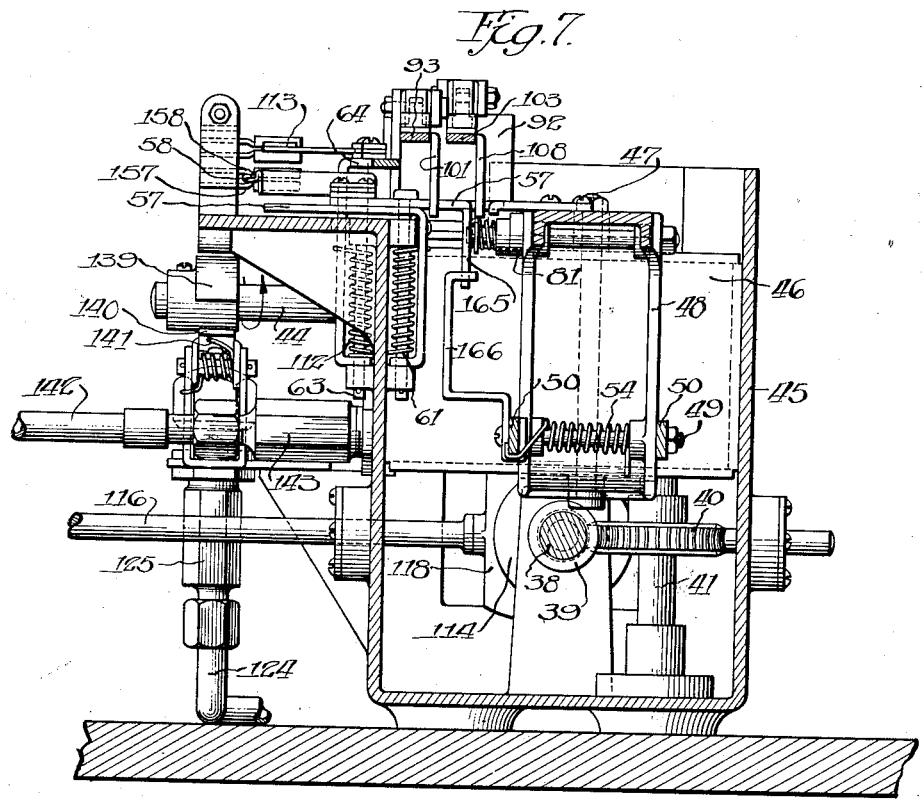
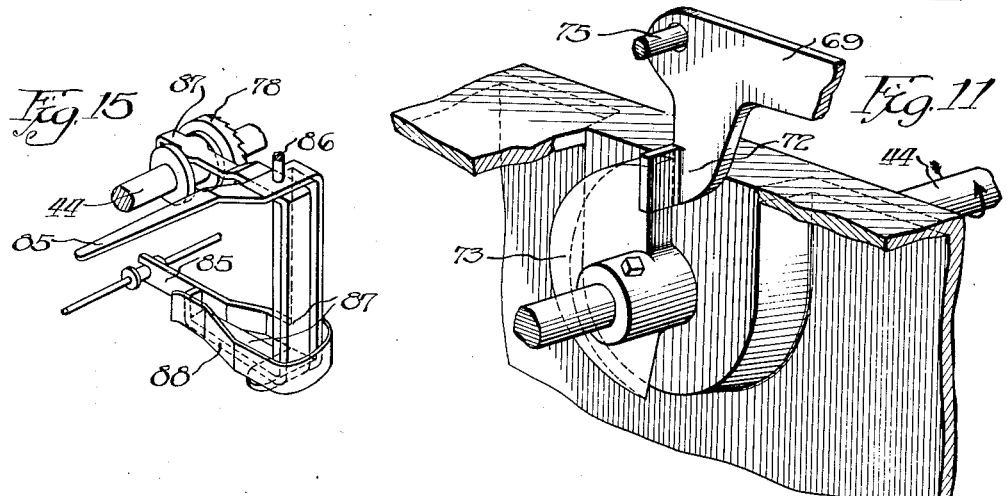
Witness:
E. L. Niederhofer
Inventor:
Frank A. Lundquist
By Casper L. Redfield
Atty

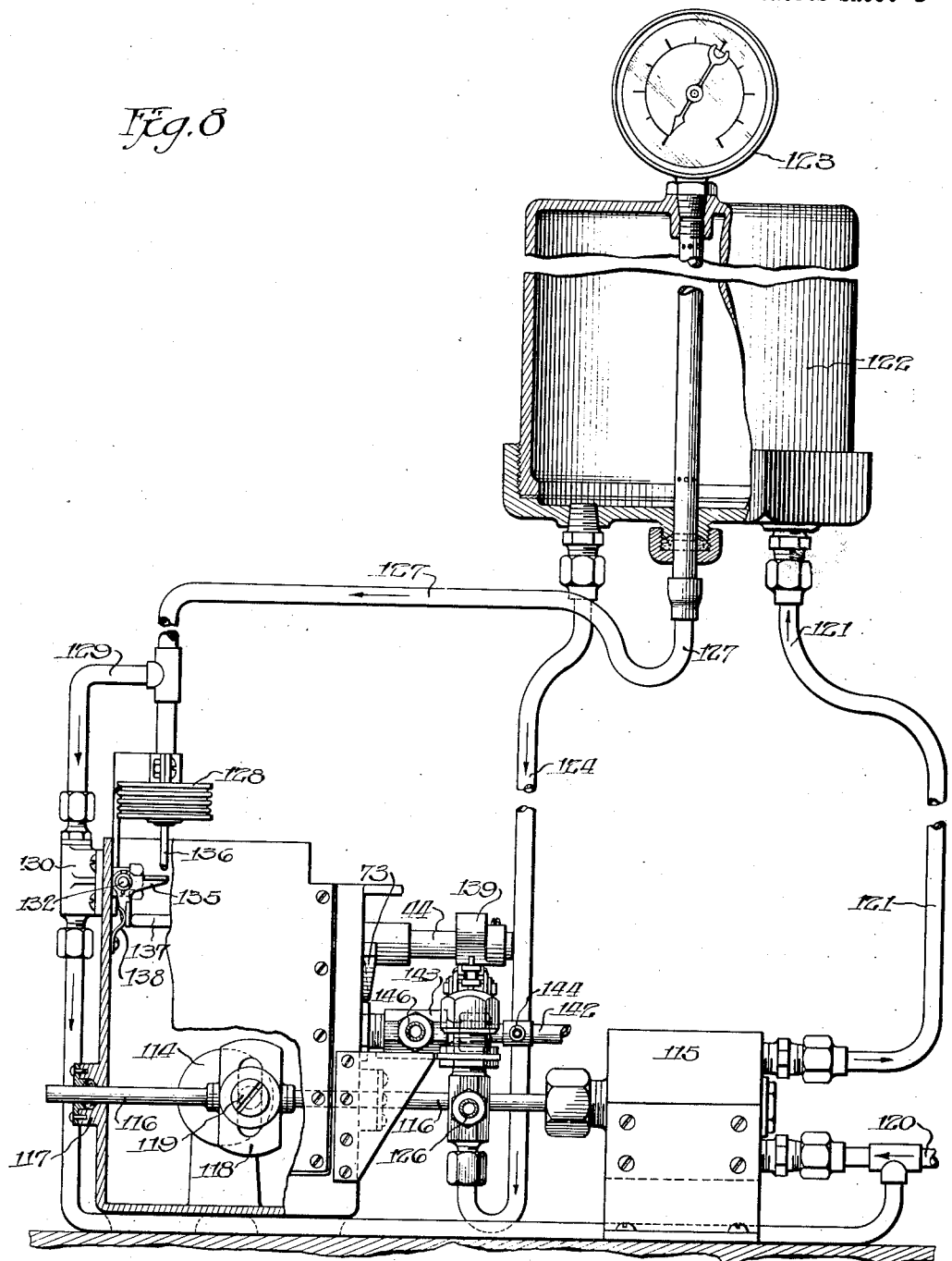

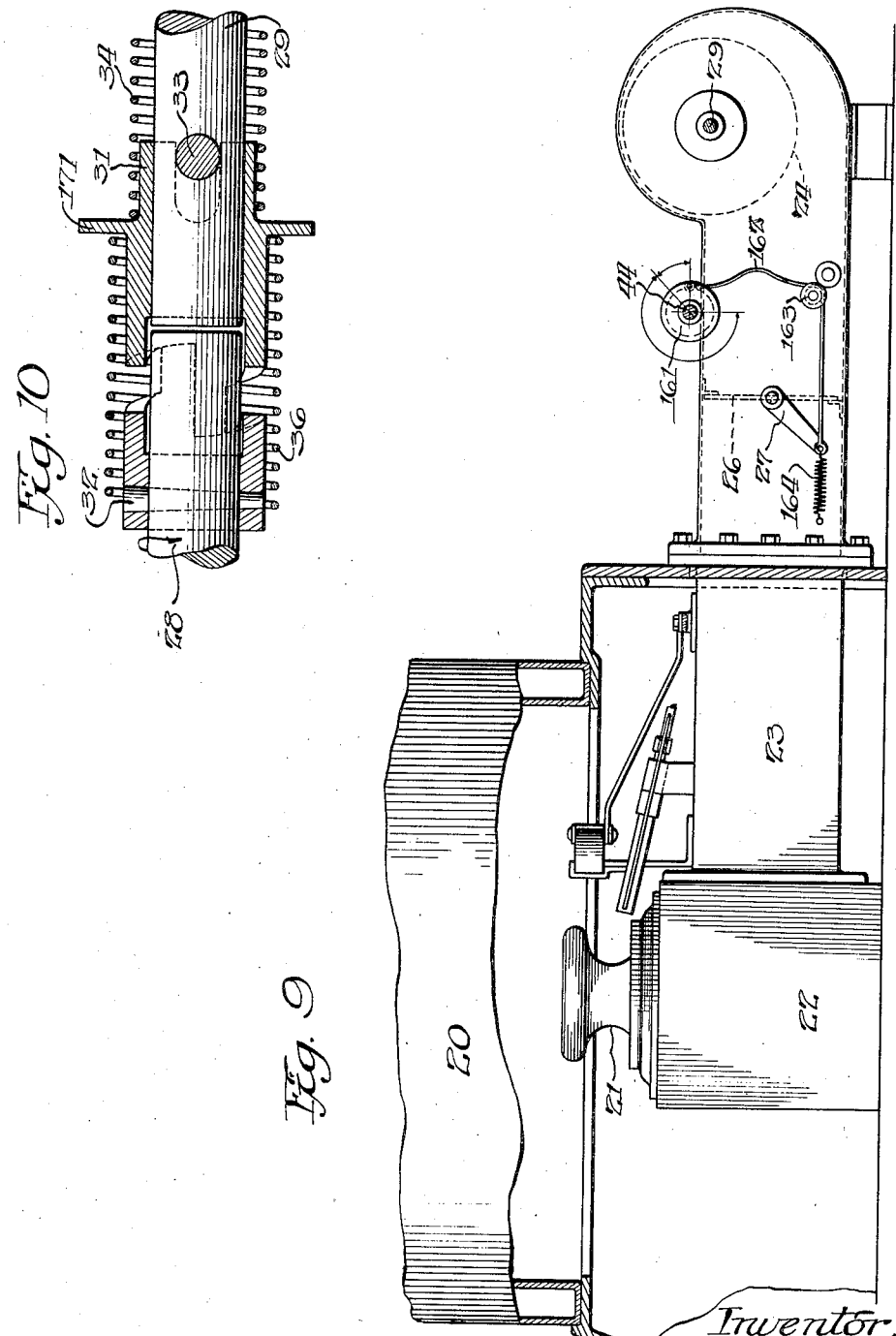

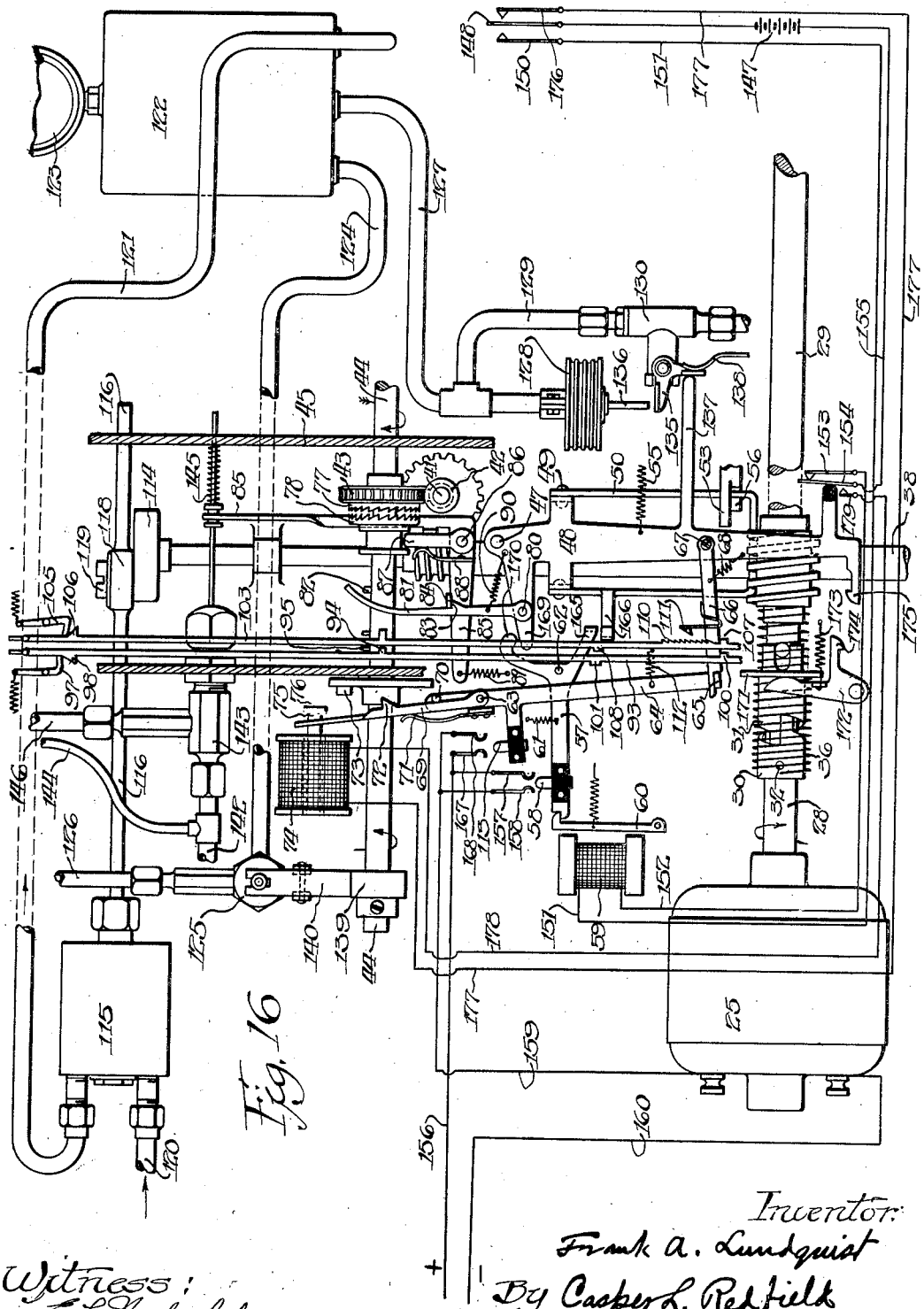

Patented May 24, 1927.

1,630,022

UNITED STATES PATENT OFFICE.

FRANK A. LUNDQUIST, OF CHICAGO, ILLINOIS, ASSIGNOR TO NEW PROCESS BURNER CORPORATION, OF CHICAGO, ILLINOIS, A CORPORATION OF ILLINOIS.

AUTOMATIC CONTROL FOR OIL BURNERS.

Application filed February 28, 1924. Serial No. 695,699.

My invention relates to an automatic control for oil burners, and has for its object the production of improved devices for that purpose. Among the specific objects to be obtained automatically are a control of room temperature within predetermined limits, and the shutting off of the flow of oil or gas in case the fire becomes extinguished, or any operations do not proceed in their intended order. The other objects will appear in the description.

In the accompanying drawings—

Fig. 1 is a plan, partly in section, of a furnace containing an oil burner, and of the devices for controlling the feed to the burner;

Fig. 2 is an enlarged plan of the control mechanism;

Fig. 3 is a side elevation, being a section on line 3—3 of Fig. 2;

Fig. 4 is a section on line 4—4 of Fig. 2;

Fig. 5 is a plan, being a section on line 5—5 of Figs. 3 and 4;

Fig. 6 is a section on line 6—6 of Fig. 2;

Fig. 7 is a section on lines 7—7 of Figs. 2 and 4;

Fig. 8 is a rear elevation, being a section on line 8—8 of Fig. 2;

Fig. 9 is a section on line 9—9 of Fig. 1;

Figs. 10 to 15 are details which will be described hereinafter; and

Fig. 16 is a diagram.

Referring first to Figs. 1 and 9, the furnace 20 has in its interior a burner 21 of the type illustrated in the application of Carl E. Stromquist, Serial No. 572,404, filed July 3, 1922. The burner 21 sets on a pedestal 22. Connected to the side of the pedestal is an air duct 23, and in the outer end of this duct is a fan 24 driven by a motor 25. In the duct or pipe 23 is a damper or air valve 26 operated thru a lever 27 in a manner which will be hereinafter described. The pedestal 22 is in fact a continuation of the duct 23 by means of which the fan 24 conveys air to and around the burner 21.

The fan is driven by the motor thru shafts 28 and 29 which are connected together by coupling members 30 and 31. (Figs. 2, 6, 10 and 16.) The member 30 is secured to the shaft 28 by means of pin 32 (Fig. 10), and member 31 is slidable on shaft 29 but is retained from turning thereon by pin 33. The members 30 and 31 have inclined faces where they contact with each other as shown in Figs. 2, 10 and 16, and a spring 34 between the axially movable member 31 and a worm gear 35 secured on the shaft 29 serves to press said movable member toward the stationary member 30. When the motor is driving the fan in the direction of the arrows in Figs. 2, 6, 10 and 16, the force of the motor and the resistance of the fan cause member 30 to turn with respect to member 31, and member 31 to move axially with respect to member 30. This last is due to the movement of the inclined faces with respect to each other, and is resisted by a compression of spring 34. It is also resisted by a spring 36 which has one end connected to one member and the other end connected to the other member. The resistance of these springs is not enough, however, to prevent the member 30 pushing the member 31 axially on shaft 29, and in running condition the members are related to each other so as to push the member longitudinally. But when the motor stops there is no longer a resistance by the fan and the springs 34 and 36 serve to move the member 31 toward member 30.

The worm 35 engages and drives a gear 37 on shaft 38, and on this shaft is a worm 39 which engages and drives a gear 40 on the vertical shaft 41. On the upper end of shaft 41 is a worm 42 which engages a gear 43 loose on shaft 44. (Figs. 2 and 16.) As a result of these connections thru three worms and their gears, the speed of gear 43 is very slow as compared to that of the motor shaft 28.

The shaft 44 may be called a "master shaft" because thru this shaft is controlled the supply of air, gas and oil to the furnace. As will be explained later, this shaft is normally free from the motor but is connected thereto for a short period for the purpose of advancing it from its normal position. During this advance movement, the master shaft opens valves for admitting air, gas and oil to the burner in the furnace and then closes the gas valve while holding the other valves open. In this condition, the master shaft is freed from the motor but is held in its advanced position by a suitable catch or stop against the force of a retracting spring. The air and oil valves are subsequently closed by releasing the catch so that the retracting spring may return the master shaft to its normal position.

Inside of the frame work or casing 45 is a bridge 46 (Figs. 2 and 4), and supported by this bridge is a pivoting pin 47. Pivoted on pin 47 is a long lever 48, and pivoted at 49 on the lower part of lever 48 is a bail 50 which extends forward to gear 37 and has therein a notch 51 arranged to engage a pin 52 on said gear. (Fig. 6.) The bail 50 is supported normally in an elevated position against a stop 53 by means of a spring 54 on pivot 49, and the lever 48 is held toward the right (as seen in Figs. 2, 5 and 16) by a spring 55 with the bail against a branch 56 of the stop 53.

Pivoted at 62 (Figs. 2 and 16) is a lever 57 carrying an insulated knife 58 for closing an electrical connection as will be explained later. Near by is a magnet 59 having a hooked armature 60 adapted to engage lever 57 and hold the knife 58 from electrical engagement. When the magnet 59 attracts the armature 60, the spring 61 moves the lever to close the knife switch 58.

Pivoted at 63. (Figs. 2 and 16) is a lever 64 which has on its forward end a turned up part 65 arranged to engage a lever 66 pivoted at 67 on lever 48. A spring 68 holds lever 66 in contact with upturned end 65. Mounted on the pivot 63 of lever 64 is a pivoted arm 69 which is held against a stop 70 by means of a spring 71. The free end of arm 69 extends downward thru an opening in the frame and has a tip 72 which is adjacent to a cam 73 on shaft 44. (Fig. 11).

Adjacent to the opening just mentioned is a solenoid 74 whose armature 75 extends thru a hole in the arm 69 and has a head 76. When the solenoid is energized by an electric current the head 76 strikes the arm 69 and moves it on its pivot toward the left as shown in Figs. 2 and 16.

The gear 43 has a clutch member 77, and splined on the master shaft 44 is another clutch member 78. When the member 78 is moved into engagement with member 77, shaft 44 is driven in the direction of the arrows in Figs. 2, 11 and 16. On shaft 44 adjacent to gear 43 is a spring 79 (Fig. 2), one end of which is connected to the shaft and the other end of which is connected to the frame 45. When the clutch members are in engagement with each other, the spring 79 is wound up by the drive thru worm 42 and gear 43. In this movement, the thin edge of cam 73 enters behind tip 72 of arm 69 and pushes it to the left against the force of spring 71. By the time the thick edge of cam 73 has passed the tip 72, the arm 69 is moved to the right by spring 71. If the clutch is then released, engagement between tip 72 and the thick edge of cam 73 will prevent spring 79 from returning shaft 44 to normal position, which normal position may be determined by any convenient stop. This normal position of the master shaft 44 is that represented in Figs. 3 and 4.

On lever 48 directly over pivot 49 (Fig. 4) is a pivot pin 80 on which is a latch 81 which extends over a cam 82 on shaft 44. At an intermediate point the latch 81 has a lug or notch 83 arranged to engage a projection 84 (Fig. 16) on a bell crank lever 85 pivoted at 86. The other arm of the bell crank lever 85 extends to the rear and is used to control a gas valve 143 as will be described later.

Also pivoted on pin 86 is an arm 87 which is held against the rear arm of the bell crank 85 by a spring 88. The arm 87 is connected to and operates the clutch member 78 to push it into engagement with member 77. When this engagement is made, the shaft 44 is driven as previously described. In thus turning, the cam 82 engages the rear end of latch 81 and thereby releases said latch from projection 84. When this occurs, spring 89 moves bell crank lever 85 to release the clutch engagement. When cam 82 is freed from the end of latch 81, a spring 90 returns said latch to its normal position. This occurs when spring 79 returns shaft 44 to its normal position as previously described.

On the front of the frame 45 is a plate 91, and at the rear is another plate 92. Guided in slots in these plates is a bar 93 having a projection 94 (Fig. 4) secured to its under face. Fast on shaft 44 is an arm 95 arranged to engage projection 94 to move bar 93 toward the rear when shaft 44 is driven by gear 43. Near the rear of the frame is a bracket 96 to which is pivoted a hook 97 arranged to engage a tooth 98 on bar 93 and hold said bar in its rear position until said hook is released.

Bar 93 extends to a thermostat 99 in furnace 20. Near the front part of bar 93 is a pin 100 arranged to engage lever 66 and either release or hold it from engagement with the end 65 of lever 64. Also on bar 93 is a projection 101 arranged to engage lever 57 and move it on its pivot, or hold it from making electrical connection at 58. Just to the rear of guide plate 92, the bar 93 is given an inclined bend as shown at 102 in Fig. 4. If the thermostat 99 should move the bar 93 a considerable distance toward the front, the entrance of this incline 102 on guide 92 would raise projection 94 so that it would not be engaged by arm 95 when shaft 44 was turned.

At the side of bar 93 is another bar 103 of similar construction and guided in the same plates. It also has a projection exactly like 94, but adapted to be engaged by arm 104 on shaft 44. Bar 103 is also provided with a hook 105 and tooth 106 the same as those described for bar 93. Also on bar 103 are pin 107 and projection 108 which correspond to those described for bar 93. Bar 103 extends thru a series of levers shown in Fig. 1 to a thermostat 109 in the furnace, and has an incline similar to 102 on bar 93.

On one edge of bar 103 are ratchet teeth 110, and on lever 66 is a spring supported catch 111. When lever 48 is moved to the left (Figs. 1 and 16), the lever 66 carries catch 111 into engagement with teeth 110. If the connected thermostat moves bar 103 toward the front, teeth 110 will move under catch 111. If later the thermostat moves the bar toward the rear, then the teeth operating thru the catch 111 will move lever 66 on its pivot 67 to release lever 64. When this occurs, spring 112 on pivot 63 (Figs. 3, 5 and 7) moves lever 64 in the direction opposite to that which it is moved by lever 48. On lever 64 is an electrical contact 113, the connection of which is broken when the lever 66 is released by teeth 110 and catch 111.

On the rear end of shaft 38 is a crank disk 114. (Figs. 2, 4, 5, 7, 8 and 16.) At the left is an oil pump 115, the piston rod 116 of which is supported and guided in the frame at points 117. In this rod is a slotted plate 118 for crank pin 119 on disk 114. The suction for this pump is represented by pipe 120 (Figs. 8 and 16) which extends to any reservoir as a source of oil supply. The discharge from pump 115 is thru pipe 121 to pressure chamber 122, which may be provided with a gage 123.

The discharge from chamber 122 is thru pipe 124 to valve 125. If this valve is open, the oil flows thru pipe 126 to the burner 21. If the valve 125 is closed, pressure increases in chamber 122 and is conveyed thru pipe 127 to sylphon 128, and thru a branch 129 to a valve case 130. On the side of case 130 is a branch 131 (Figs. 8, 13, 14 and 16) in which is a pin 132, and in this pin is an arm 133 for moving the valve 134 in case 130. On the outer end of pin 132 is an arm 135 which is adjacent to pin 136 on the sylphon 128 and also adjacent to a projection 137 on lever 48 (Fig. 16). When lever 48 is in its normal position, projection 137 serves to hold valve 134 in open position. When the arm 48 is moved to the left, spring 138 serves to close this valve. If pressure in chamber 122 increases beyond a desired amount when valve 134 is closed, this pressure will expand the sylphon 128 to open valve 134 and permit oil to flow from chamber 122 thru the extension of pipe 129 to the inlet pipe 120 of pump 115. Under such conditions, the operation of the pump will simply cause a circulation of oil thru pipe 121, chamber 122 and pipe 129.

The pump 115 has a capacity somewhat greater than that provided for by the valve 125 and pipe 126 to burner 21. As a result the pressure maintained in chamber 122 is practically uniform, and is that pressure which expands the sylphon 128 so as to maintain the valve 134 slightly open. As so arranged, the oil flows to the burner under a uniform pressure, a thing to be desired in obtaining good combustion. This pressure may be adjusted to any desired thing by adjusting the length of the pin on the sylphon.

On the shaft 44 is a cam 139 (Figs. 3 and 16), and supported at a convenient place is a lever 140 arranged to be operated upon by this cam to open valve 125. A spring 141 serves to hold valve 125 closed when not opened by the action of cam 139.

In Figs. 1, 5 and 16, a gas supply pipe is shown at 142 extending to a valve 143. A branch 144 extends to a pilot light in the furnace adjacent to burner 21. This valve is opened by the bell crank lever 85 before mentioned, and is closed by a spring 145 (Fig. 5). From valve 143 a gas pipe 146 extends to the burner 21.

In addition to the mechanism so far described there are a battery 147, a thermostat 148 with its contacts, some wires furnishing electric circuits, contact devices, and certain minor mechanical devices. The construction and operation of these parts will be described in connection with the description of the apparatus as a whole.

We will assume a supply of gas on pipes 142 and 144 and a pilot burning in the furnace at burner 21. Also a supply of oil on pipe 120. Referring to Fig. 16, it will be assumed that the apparatus is idle, and that the temperature falls so that the thermostat makes connection to contact 150. A current then flows:—battery 147—148—150—151—magnet 59—152—153—154—155—147.

This attracts armature 60 to release lever 57 so that spring 61 can force knife 58 between contacts 157 and 158. When this occurs a current flows from a source of electricity as follows:—156—157—58—158—159—motor 25—160—source.

This starts the motor to drive fan 24 thru shafts 28 and 29. The resistance of the fan causes the coupling member 30 to rotate with respect to member 31, and this in turn pushes member 31 to the right (Figs. 2, 10 and 16) until it is stopped by contact with pin 33. After this last occurs the fan is driven at the same speed as the motor.

The driving of the fan shaft 29 causes worm 35 to drive gear 37 on shaft 38, and as crank disk 114 and crank pin 119 are on this shaft, the oil pump 115 will be driven to convey oil thru the pipes as before described. The shaft 38 also operates worm 39, gear 40, shaft 41, worm 42 and gear 43 to drive the master shaft 44 at a very slow speed as soon as clutch 77 is closed. On the outer end of shaft 44 (Figs. 1 and 9) is a disk 161 to which is connected a cord 162, which cord extends around a roller 163 to the end of lever 27. A spring 164 normally holds lever 27 in the position shown in Fig. 9, but when the shaft 44 is driven as described, the disk 161 is driven in a contra-clockwise direction to move lever 27 on its pivot and open damper 26 so that air from the fan may flow to the furnace thru duct 23.

At the time lever 57 was released by the current thru magnet 59, arm 165 on that lever struck the arm or projection 166 on bail 50 (Figs. 4, 7 and 16) to depress said bail so as to bring notch 51 in the path of pin 52 on gear 37. (Figs. 5 and 6.) When the rotation of gear 37 brings pin 52 into notch 51, the further rotation of the gear 37 moves bail 50, and consequently the lever 48, toward the left. This movement causes lever 56 to push lever 64 so as to insert contact 113 between springs 167 and 168. The springs 167 and 168 are in parallel with contacts 157 and 158 so that the circuit for motor 25 may be closed by either 58 or 113 being inserted in their adjacent springs. The same movement of lever 48 which inserts contact 113 between springs 167 and 168 causes the arm 169 on lever 48 to strike arm 170 on lever 57 and move it back into engagement with the hook on armature 60. This last is possible because the bail 50, in being moved by pin 52 on gear 37, carries its arm 166 past and clear of the end of arm 165 on lever 57. (See Fig. 7.) It is also possible because lever 48 in its first movement opened the connection 153—154 to break the circuit for magnet 59.

Reviewing the electrical part of what has been given it will be seen that when the temperature falls so that an electrical connection is made at contact 150, the magnet 59 releases lever 57 so that a temporary circuit may be closed at 58 for the motor 25. The motor in turn starts a series of operations, one part of which consists in breaking the temporary connection thru 58 and substituting therefor a permanent connection thru 113, which permanent connection is held until it is desired to stop the motor.

On the coupling member 30 is a flange 171, and pivoted at a convenient place is a bell crank 172 having one arm held in engagement with flange 171 by spring 173. On the other arm is a hook 174, and on the lever 48 is a corresponding hook 175. When the coupling member 31 moved to the right at the time the motor started, the spring 173 moved bell crank 172 on its pivot, and when gear 37 moved lever 48 to the left it carried hook 175 into engagement with hook 174 to hold lever 48 in moved position until hook 174 is later released from hook 175.

The movement of lever 48 to the left also causes latch lever 81 to move the bell crank 85 so as to close clutch member 78 to member 77 and thus start shaft 44 turning in the direction shown by the arrow. The movement of lever 64 consequent upon the movement of lever 48 brings the end of arm 69 in the path of the cam 73. The flat side of this cam as shown in Fig. 11 is represented in Fig. 16 by a pin on a disk. As the shaft 44 turns this cam in a contra-clockwise direction as seen in Fig. 11, the thin edge (shown at the bottom) enters behind the lower part 72 on arm 69 and presses that arm toward the left against spring 71. By the time the shaft 44 has carried the cam 73 to the position shown in Fig. 11, the spring 71 moves the end 72 of lever 69 behind the flat face of the cam and prevents a return of shaft 44 to its original position until this catch is released.

Immediately after the cam 73 has reached the position just indicated, the cam 82 on shaft 44 (Figs. 4 and 16) strikes the latch lever 81 to release bell crank 85, whereupon spring 89 moves the bell crank to release the clutch 78 from gear 43. Under these conditions the spring 79 (Fig. 2) would return shaft 44 to original position were it not for the end 72 of lever 69 being behind cam 73.

Returning now to the movement of bell crank 85 to close the clutch and start the master shaft 44, that movement opens the gas valve 143 to permit a flow of gas to the burner to give the preliminary heating necessary to the beginning of the combustion of oil. After this heating process has been going on for a sufficient length of time, and before the shaft 44 has been moved to the limit of its movement as described in connection with cams 73 and 82, the cam 139 (Figs. 3 and 16) has moved lever 140 to open valve 125 so that oil may flow thru pipe 126 to the burner.

Reviewing the operations so far described it will be seen that immediately upon the temperature falling to a point which will make an electrical connection at contact 150, a temporary circuit is formed for the motor 25. The operation of the motor sets into operation other parts which substitute a permanent circuit for the temporary one, and which lock the moved parts in moved position. The moving of these moved parts opens the gas supply to the burner, starts the oil pump going, and starts the master shaft 44 into very slow movement. This slow movement is for the purpose of giving ample time for preliminary heating of the burner before the shaft has made more than about three-quarters of a revolution.

At the first movement of the shaft 44 it takes up the slack in the cord 162 and begins to open the damper 26. At the instant of starting the gas valve is opened by the movement which connects the clutch for starting purposes. After the master shaft has moved about one-eighth of a revolution, and the burning gas has had time to heat the burner, the cam 139 begins to open the valve 125 so that oil may begin to flow gradually to the burner. After the shaft has moved about another one-eighth, the oil valve is completely open. During the next one-half revolution, approximately, both gas and oil are burning. At about this time, cam 82 releases bell crank 85 to open the clutch and close the gas valve. When the clutch is opened, spring 79 gives the shaft a slight reverse movement until it comes to a stop with cams 73 against the end 72.

Stating these things in other words, the master shaft 44 is moved gradually to perform certain operations in sequence and then is locked in moved position. This locking is like the locking previously mentioned for lever 48. In both of these cases there is a spring tension acting to move the parts back to normal position when the locks are released. In the case of lever 48 it is spring 55, and in the case of the shaft 44 it is spring 79.

When the temperature falls enough to make electrical connection to contact 176, a circuit is completed for solenoid 74 thru contact 179 which was automatically closed when the lever 48 was moved to the left as before described. (Fig. 16.) This circuit is as follows:—battery 147—148—176—177—solenoid 74—178—179—154—155—147.

This causes the armature 75 to move lever 69 so as to release end 72 from cam 73, whereupon spring 79 returns the master shaft to its normal position which may be determined by any convenient stop. When this occurs, the valve 125 is closed by spring 141, and oil is shut off from the burner. The motor, however, continues to operate for a time.

When lever 48 was moved to the left, the hook 111 was brought into engagement with teeth 110 on bar 103, and when fire is burning in the burner, thermostat 109 is expanded to move bar toward the front, and consequently to move teeth 110 under hook 111. Thermostat 109 is close to the flame and consequently is rapidly heated when the fire is started and rapidly cooled when it is extinguished. As the thermostat 109 contracts by cooling, the bar 103 is drawn toward the rear and carries hook 111 with it to release lever 66 from the end 65 of lever 64. When this occurs, spring 112 moves lever 64 to break the motor circuit at contact 113.

When the motor stops there is no longer a torsional strain between motor and fan, and springs 34 and 36 act to move clutch member 31 back to its normal relationship to member 30. This movement of member 31 causes flange 171 to move bell crank 172 on its pivot to release hook 174 from hook 175. When this occurs, spring 55 returns lever 48 to its normal position.

As before stated, thermostat 109 is close to the flame in the furnace, and is heated before the oil is admitted. If this heating occurs as it is intended to occur, then the bar 103 is pushed forward in the guide plate 92 by the thermostat, and in thus being pushed forward the projection on its under face corresponding to the projection 94 on bar 93, will be lifted clear of arm 104. Under such conditions, the arm 104 will produce no result when the shaft 44 is turned.

If for any reason gas should not flow thru pipe 146 to the burner, or the pilot light should become extinguished so that gas flowing thru pipe 146 did not become ignited, then there will be no expansion of thermostat 109, and the projection on bar 103 would not be raised clear of arm 104. Under such conditions, the rotation of shaft 44 will cause arm 104 to move bar 103 toward the rear, and this operation will release lever 66 from lever 64 so that the motor circuit will be broken at contact 113 by the action of spring 112. Also, the projection 108 will hold lever 57 so as to prevent a temporary circuit being made at 58. The breaking of the motor circuit results in all parts being returned to their normal positions except bar 103 which becomes hooked up by hook 105. This must be released manually before the apparatus can be started.

Thermostat 99 is also in the furnace and not far from the flame. If the process of starting a fire runs smoothly as intended, then bar 93 is moved toward the front and projection 94 is lifted clear of arm 95 on the master shaft. It is intended that the expansion of thermostat 99 for this purpose shall take place only as a result of burning both gas and oil in the furnace. The gas alone is intended only for the heating of the burner 21 and the thermostat 109 which is close to that burner. If no oil should flow thru pipe 126 as intended, then bar 93 will not be pushed forward, and arm 95 will operate to push it toward the rear. The effect of this will be just the same as that described for the expansion of thermostat 109. The power of thermostats 99 and 109 is made sufficient to move their respective bars forward against such resistance as such bars normally have, but such power is not sufficient to resist the backward push of the master shaft driven by the motor.

If the fire starts in the designed way, then both thermostats in the furnace are operated to push their bars toward the front. If later the supply of oil should give out, or the fire become extinguished from other cause, then thermostat 109 will contract and draw the bar 103 rearward. But in expansion, the teeth 110 had moved under catch 111 with the result that a contraction will release lever 66 from lever 64, and all parts will return to normal position as before described.

The thermostat 148 is for controlling the starting and stopping of the fire by room temperature. Thermostats 99 and 109 are safety devices. Thermostat 109 also acts as the direct agent in stopping the motor. If the electric current flowing from the source to the motor should go off for any reason, the consequent stoppage of the motor will relieve the torsional strain between motor and fan, and all parts will return to normal position, as before described. When the current comes on again, nothing will happen unless, or until, the circuit is closed by the thermostat operated by room temperature. It will thus be seen that no damage can occur by reason of a temporary interruption of the current from the source.

What I claim is:

1. In a furnace control mechanism, a motor, a thermostat and connections for starting the motor into operation, devices moved by the motor for conveying oil to a point of combustion in the furnace, and means controlled by the thermostat for shutting off the supply of oil when room temperature rises above a predetermined point such shutting off being independent of the operation of the motor.

2. In a furnace control mechanism, a motor for conveying fuel to a furnace, means controlled by a thermostat for completing a temporary circuit for the motor, and means operated by the motor for substituting a permanent circuit for the temporary circuit.

3. In a furnace control mechanism, a motor for conveying fuel to a furnace, a spring actuated device for completing a temporary circuit for the motor, restraining means for the spring actuated device, a thermostat and electrical connections for releasing the restraining device, and means operated by the motor for substituting a permanent circuit for the temporary circuit.

4. In a furnace control mechanism, a motor for conveying fuel to a furnace, means controlled by temperature for completing a temporary circuit for the motor, means operated by the motor for substituting a permanent circuit for the temporary circuit, a spring under tension to open the permanent circuit, a restraining device for holding the circuit closed, and temperature controlled means for releasing the restraining device.

5. In a furnace control mechanism, a power driven shaft, a fan and pump driven by said shaft and serving to convey air and oil to a furnace, normally closed valves for the air and oil channels, means for connecting the shaft to the valves for opening them and for disconnecting the shaft from the valves after they are open, springs under tension to close said valves, restraining devices for holding the valves open, and temperature controlled means for releasing the restraining devices.

6. In a furnace control mechanism, devices moved by power to a position which permits fuel to be conveyed to a furnace, retractive means under tension to move said devices so that fuel will no longer be conveyed to the furnace, restraining devices for holding the retractive means from operation, and temperature controlled means for releasing the restraining devices.

7. The combination with a burner, and a pipe for conveying gas from a source to maintain a pilot light at the burner, of a pipe for conveying a larger quantity of gas to the furnace, a valve in the larger pipe, temperature controlled mechanism for opening said valve, and automatic means for closing said valve after a predetermined interval of time.

8. The combination with a burner, and means for maintaining a pilot light at said burner, of pipes for conveying gas and oil to the burner, valves normally closing said pipes, temperature controlled mechanism for opening the gas and oil valves in succession with a short interval of time between, and automatic means for closing the gas valve after the oil valve has been open for a predetermined length of time.

9. The combination with a burner, and means for maintaining a pilot light at said burner, of pipes for conveying gas and oil to the burner, valves normally closing said pipes, a motor and mechanism operated thereby for opening the gas and oil valves in succession, and automatic means operated by the motor for closing the gas valve after the oil valve has been opened.

10. The combination with a burner, and means for maintaining a pilot light at said burner, of pipes for conveying gas and oil to the burner, valves normally closing said pipes, power operated mechanism for opening the gas and oil valves in succession, locking devices for holding said valves open, and automatic means for releasing the locking device for the gas valve after the oil valve has been opened.

11. In a furnace control mechanism, pipes for conveying air, gas and oil to a furnace, valves in said pipes, and a master shaft arranged to control the open and closed condition of said valves.

12. In a furnace control mechanism, means for conveying fuel and air to a furnace, a master shaft for controlling the open and closed condition of the channels for fuel and air, and a thermostat for controlling the position of said shaft.

13. In a furnace control mechanism, a power device for conveying fuel and air to a furnace, a master shaft for controlling the open and closed condition of the channels for fuel and air, temperature controlled means for connecting the power device to the shaft so as to move the shaft to open such channels, and separate means also temperature controlled for returning the shaft to normal position so as to close said channels.

14. In a furnace control mechanism, a master shaft for controlling the starting and stopping of combustion in a furnace, a power device normally disconnected from said shaft, temperature controlled means for connecting the shaft to the power device to move said shaft, automatically operating means for disconnecting said shaft, a retracting spring for returning said shaft to normal position when so disconnected, a locking device for holding the shaft from being retracted, and temperature controlled means for releasing said locking device.

15. In a furnace control mechanism, a pipe and means for conveying oil therethru to a point of combustion, a valve controlling the flow of oil thru the pipe, automatic means acting to close said valve, and means controlled by the temperature of the furnace for restraining said automatic means from operation.

16. In a furnace control mechanism, a motor for conveying fuel and air to a furnace, valves controlling such conveyance, means operated by the operation of the motor for maintaining said valves open, and automatically operating means serving to close said valves upon any stoppage of the operation of the motor in maintaining them open.

17. In a furnace control mechanism, a motor for conveying fuel and air to a point of combustion in a furnace, valves controlling such conveyance, automatically operating means for closing said valves, restraining means for preventing the automatic operating means from acting, and means by which the restraining means may be released either by a fall of temperature in the furnace or by a stoppage of the motor.

18. In a furnace control mechanism, a motor for conveying fuel to a point of combustion in the furnace, means controlled by the fall of room temperature for starting the motor into operation, means operated by the motor for automatically causing a stoppage of the motor after it has been in operation for a brief interval, and means controlled by a rise of temperature in the furnace for preventing such automatic stoppage of the motor.

19. In a furnace control mechanism, a motor for conveying fuel to a point of combustion in a furnace, an electric circuit for the motor, means controlled by a fall of room temperature for closing the motor circuit, means operated by the motor for breaking said circuit after the motor has been in operation for a brief interval of time, and means controlled by a rise of temperature in the furnace for preventing such breakage of the motor circuit.

20. In a furnace control mechanism, a motor for conveying fuel to a point of combustion in a furnace, an electric circuit for the motor, means controlled by a fall of room temperature for closing the motor circuit, a device operated by the motor and serving to break the motor circuit after the motor has been in operation for a brief interval, means controlled by a rise of temperature in the furnace for making said device ineffective to cause a breakage of the motor circuit, a second device also operated by the motor and serving to cause a breakage of the circuit after a longer interval of time, and means controlled by a further rise of temperature in the furnace for making the second device ineffective.

21. In a furnace control mechanism, a motor for conveying fuel to the furnace, an electric circuit for the motor, thermostatic controlled means for closing said circuit, means operated by the motor for breaking the circuit after either of two intervals of time, and means operated by successive rises of temperature for breaking said circuit.

FRANK A. LUNDQUIST.